United States Patent [19]

Thomason

[11] 4,265,219
[45] May 5, 1981

[54] SOLAR HEATING (COOLING) SYSTEM

[76] Inventor: Harry E. Thomason, 609 Cedar Ave., Fort Washington, Md. 20022

[21] Appl. No.: 66,497

[22] Filed: Aug. 14, 1979

Related U.S. Application Data

[60] Continuation of Ser. No. 926,527, Jul. 20, 1978, abandoned, which is a division of Ser. No. 398,323, Sep. 18, 1973, Pat. No. 4,102,327.

[51] Int. Cl.³ .......................... F24J 3/02; F24D 11/00; G05D 23/00
[52] U.S. Cl. .................................. 126/419; 126/437; 165/18; 236/91 A
[58] Field of Search ............... 126/430, 422, 436, 419, 126/400, 437; 165/18; 236/91 E, 91 A, 91 F

[56] References Cited

U.S. PATENT DOCUMENTS

| | | | |
|---|---|---|---|
| 2,257,471 | 9/1941 | McGrath | 236/91 E |
| 2,396,338 | 3/1946 | Newton | 126/422 |
| 2,519,266 | 8/1950 | Main | 236/91 E |
| 2,555,012 | 5/1951 | Spofford | 165/18 |
| 2,575,478 | 11/1951 | Wilson | 237/1 A |
| 2,584,445 | 2/1952 | Hajek | 236/91 E |
| 2,713,252 | 7/1955 | Jackson et al. | 165/18 |
| 2,812,142 | 11/1957 | Pinckaers | 236/91 E |
| 2,898,434 | 8/1959 | Lemmerman et al. | 165/18 |
| 3,007,024 | 10/1961 | Hensen | 236/91 E |
| 3,188,553 | 6/1965 | Eurenius | 236/91 E |
| 3,236,294 | 2/1966 | Thomason | 126/430 |
| 3,254,703 | 6/1966 | Thomason | 126/430 |
| 3,399,832 | 9/1968 | Wilson et al. | 236/91 E |
| 3,408,004 | 10/1968 | Miller | 236/91 E |
| 3,450,862 | 6/1969 | Kralovec | 236/91 E |
| 3,724,534 | 4/1973 | Weatherson | 165/22 |
| 3,799,145 | 3/1974 | Butterfield | 126/437 |
| 3,812,903 | 5/1974 | Thomason | 165/18 |
| 3,888,303 | 6/1975 | Skala | 165/18 |
| 4,102,327 | 7/1978 | Thomason | 126/437 |

Primary Examiner—Daniel J. O'Connor

[57] ABSTRACT

For solar heating (with cooperating cooling) both simplification and automatic control are needed. In the present invention solar heating and air conditioning apparatus is improved in various ways. For example, the furnace for auxiliary heat is eliminated. Operation of the solar heat collecting apparatus may be made automatic, or manual selective collection of solar heat may be obtained, for cold or cool weather conditions. A solar heat collector coating is provided that is changeable in absorption characteristics, so as to collect more heat when operating in winter and to reject heat when not operating during hot summer weather. An improved heat collector trough is provided for the solar heat collector.

7 Claims, 3 Drawing Figures

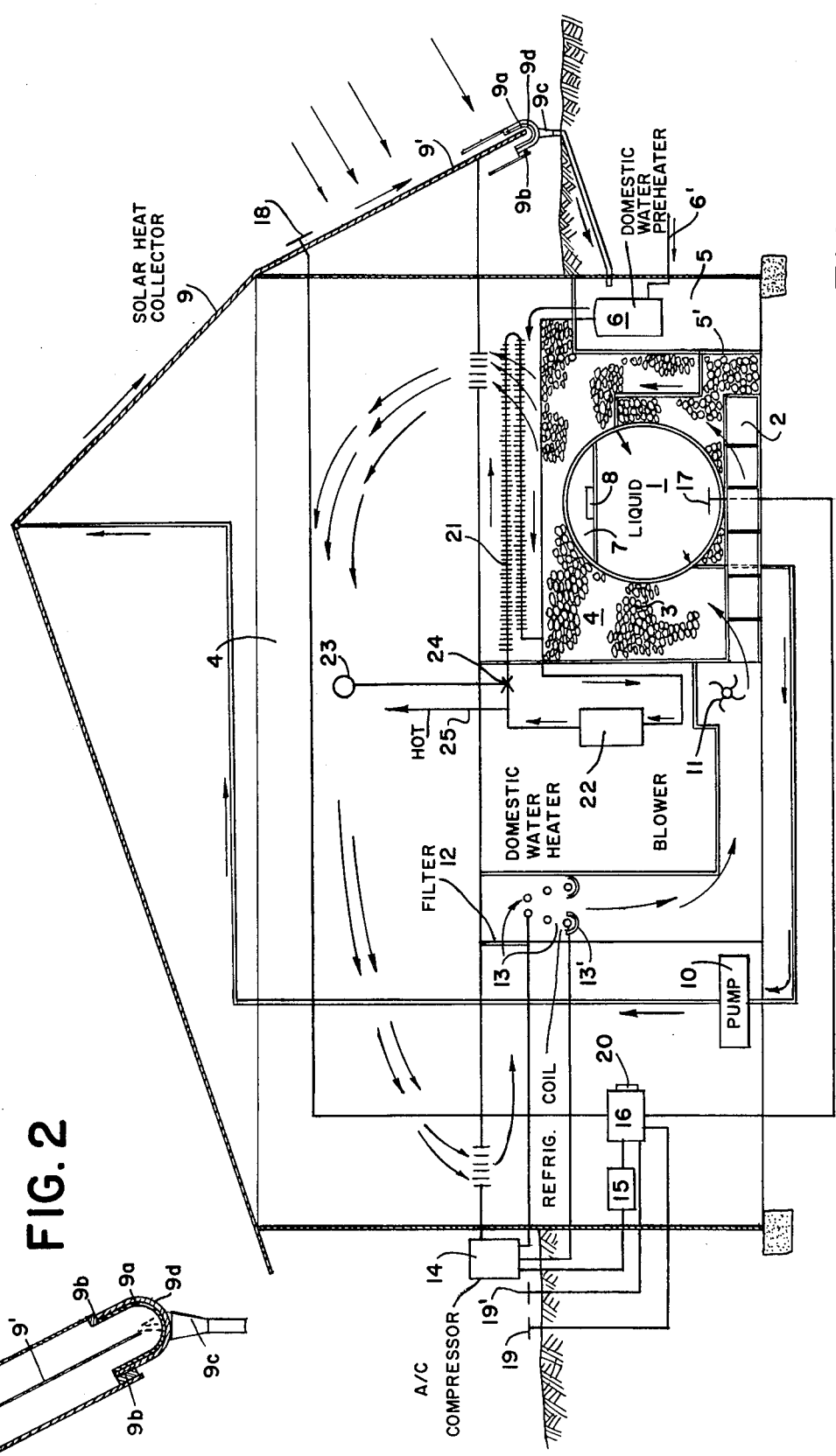
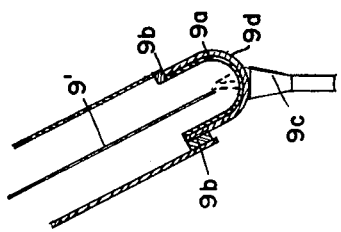
FIG. 1
FIG. 2

SOLAR HEATING (COOLING) SYSTEM

This is a continuation of Ser. No. 926,527, filed 7/20/78 now abandoned, which in turn was a division of Ser. No. 398,323, filed 9/18/73 now U.S. Pat. No. 4,102,327.

INTRODUCTION

The most successful solar heating systems to date include a tank of liquid surrounded by stones for heat storage as described in a series of Thomason patents (e.g. U.S. Pat. No. 3,254,702). A separate furnace or other heat source is used in some of the Thomason systems, as well as most other systems, when auxiliary heat is needed. The furnace, of course, increased the cost and complexity of each system. So, it is desirable to eliminate the furnace.

For cold weather, solar heat collection should be at a maximum. The circulating pump should be operated most of the sunny hours to get heat from the solar heat collector and into storage. However, when the weather is only moderately cold heat collection can be reduced, and when it is only chilly or warm, collection should be almost or completely eliminated. Indeed, overheating will be experienced if solar heat collection is not sharply reduced or shut down during warm or hot weather. If the system includes air conditioning it should be cut on during hot weather. Automatic control is desirable for the purposes outlined above.

Changeable absorption of solar energy is desirable to obtain more winter solar heating but to reject excessive solar heat during the summer. A simplified lower-cost solar heat collector trough is needed.

The present invention helps solve the problems of solar heating and air conditioning as more particularly set out hereinafter.

BRIEF DESCRIPTION

A. Heating

A tank containing liquid in a heat storage bin is surrounded by non-liquid material such as stones or heat-of-fusion heat storage material. Liquid from the tank is pumped to the top of a solar heat collector and is spread out to flow down over the heat collector sheet for heating during the winter. The solar warmed water is collected in a trough at the bottom of the collector and returns to the tank where the heat is stored and where it heats the non-liquid material. Then as heat is needed from storage a blower is turned on by a thermostat to blow air through the storage bin to warm the air. When stored heat is inadequate auxiliary heat is added near the top of the storage bin. Various types of apparatus may be used. Two examples are as follows.

1. A simple and low-cost way of eliminating the furnace in the present invention is to utilize a small section at or near the top of the tank as a combustion chamber for fossil fuels, or for an electric heater or other source of heat. Then when auxiliary heat is needed it is added after the air circulating up through the bin picks up what heat it can from the tank and stones or other storage material. Auxiliary heat is not wasted in heating the heat storage material. And, only a single blower, a single filter, etc. are needed, with no dampers, thereby simplifying the system and reducing costs. Indeed it has been found that some heat comes out of storage by natural convection currents without using any blower power at all.

2. Another simple and low-cost approach is to utilize a portion of the heat output of the domestic water heater for auxiliary heat as will be explained more fully hereinafter.

B. Cooling, dehumidification

For summertime, a cooling coil chills the air and dries it as it enters the heat (cold) storage bin. The cold dry air chills and dries the stones, etc. for cold and dry storage. The cooling and drying may be accomplished at night by a common electric compressor-evaporator cooling system or during the day by a solar air conditioning system. Coolness and dryness are stored for use at later periods. Then warm moist air from the home or other space is cooled and dehumidified as it is circulated through the cold-dry storage bin.

C. Automatic or selective heat collection and cooling

For solar heat collection a small circulating pump is used to pump liquid from storage through the collector and back to storage. When maximum heat is needed the pump should operate whenever the temperature in the collector is somewhat higher than that in storage and should cut off when useful heat is not available. Therefore a sensor is placed in the collector and another in the storage bin. A pump control unit compares the temperatures and turns the pump on and off accordingly as described by Harry E. Thomason in "Sun at Work" newsletter, Fourth Qarter 1963, article entitled "Lower Cost House-Heating Control." The pump cuts on automatically if the heat collector temperature exceeds that in storage by a pre-set differential, say 5° F. A sensitivity control made it possible to change that differential for a particular installation so that the pump could be operated with a 1° differential, or a 25° differential, or other in between. That was a calibrating sensitivity control and it was set for optimum solar heat collection of a particular solar heating plant. Once set, at say a 5° differential, it was not normally changed because there was no need to change it. The optimum setting could be 5° for one plant or it could be higher or lower for other plants. But, once the optimum differential was selected for a particular solar heating plant there was no need to change the setting.

Although the control described in "Sun at Work" was an electronic control, using electrical sensors and so on, other types of differential sensors apparently could be used, e.g. pneumatic or liquid units where expansion of a gas or liquid due to heat in one area, as compared with less heat in another area, would close the pump switch, (see U.S. Pat. No. 3,016,746). But now, the differential must be variable if it is to be operated as taught herein. In previous systems the heat collector pump had to be disabled or shut off manually during warm weather to avoid overheating of the home. The present invention teaches a new method of operation, and new apparatus, for selective solar heat collection in accordance with the need for solar heat. Additionally, it teaches automatic selective collection, with automatic switchover to cooling during hot summer weather.

D. Changeable solar absorption-reflectance; Improved collector trough

A specially selected or treated coating on the exposed surface of a solar heat collector yields an unexpected and desirable result. During the heating season water or other liquid flowing over the surface changes the surface from a higher degree of reflectivity to a higher degree of absorvtivity. Therefore the collector is more efficient when in use during the winter. However, when not used during the summer the dry surface reflects away more of the heat, thereby reducing the tendency for the solar heat collector to overheat, and prolonging the life of the collector.

The heat collector trough is improved by simple, low-cost, easy-to-install construction.

IN THE DRAWING

FIG. 1 diagrammatically illustrates the various features.

FIG. 2 is a fragmentary detail of the collector trough.

Figure 3:
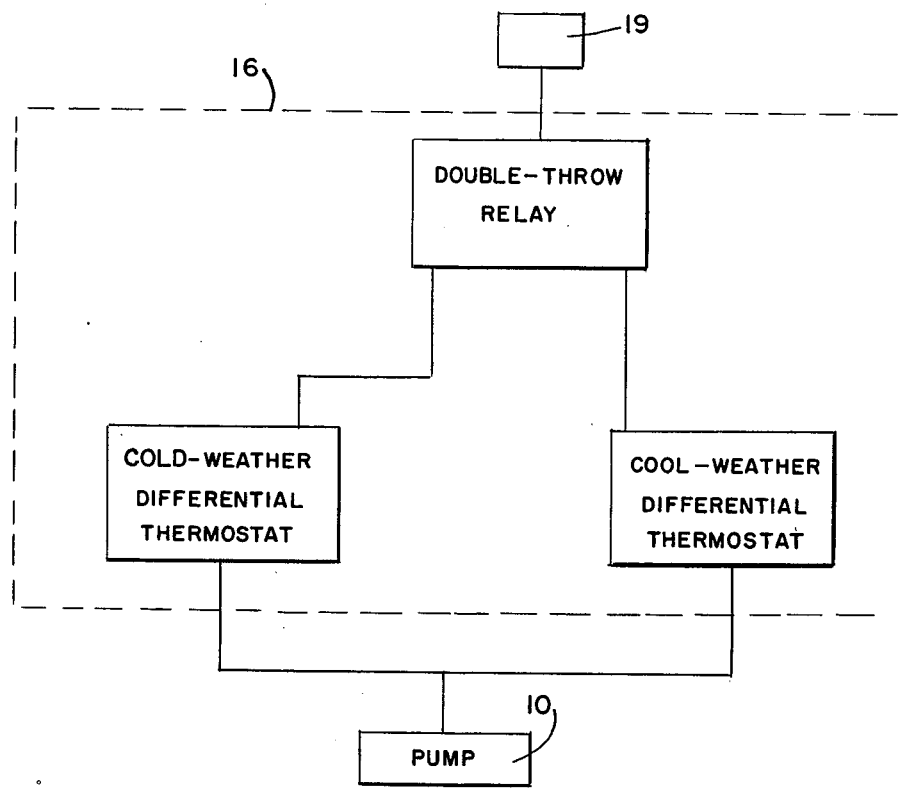
FIG. 3 is a control.

A liquid storage container 1 rests on an air distributor manifold 2 and is substantially surrounded by stones 3 in substantially air-tight heat-cold storage bin 4. A domestic water pre-heater container 5 preferably has insulation 5′ therearound and has a smaller container or heat exchanger 6 inside with a cold water inlet pipe 6′. Near the top of container 1 is a space 7 for an auxiliary heat source 8. If desired a baffle may be used to separate the air and liquid spaces, or the surface of the water itself may be used as the bottom of the air space. Oil or gas combustion equipment, or electric heating equipment, or a heat exchanger supplied with heat from the domestic water heater of the home, or other heat source, may be used above the surface of the water, or above the baffle if a baffle is used. The desired level of the water may be maintained by conventional float controlled valve apparatus, or by automatic rainwater makeup and overflow apparatus described in several Thomason patents (e.g. U.S. Pat. No. 3,254,702), or other. Solar heat collector 9, of the open-flow type having fluid flowing over its outer surface and preferably having a changeable absorbtion surface 9′ as described more fully hereinafter, may be mounted on the roof of a building to be heated. A flexible collector trough 9a is attached at 9b to collect the liquid at the bottom of the collector and return it, through outlet 9c, to container 5 and container 1. Insulation 9d may be used to reduce heat losses. Pump 10 circulates liquid through the system. Blower 11 draws air through filter 12 and through cooling coil 13, (if cooling is used), and circulates the air through the storage bin and out to the space to be heated or cooled. Moisture condensed out of the air is carried away by drip trough 13′. Cooling compressor 14 is preferably controlled by clock switch 15 and control unit 16. Control unit 16 is connected to sensor 17 in the container, sensor 18 in the solar heat collector, sensor 19 outside of the building being heated or cooled and preferably to a manual control device 20. Another sensor 19′ may be connected to control unit 16 for use, if desired, as set out hereinafter.

Control unit 16 is connected to pump 10 and may contain a number of old and well-known elements in addition to and including those illustrated in FIG. 3. As examples of parts that could be used are, a double-throw relay, a "cold weather" differential thermostat, and a "cool weather" differential thermostat. Sensor 19 activates the double-throw relay during cold weather to activate the "cold weather" thermostat, which starts and stops pump 10. That may occur, for example, when the collector temperature exceeds storage temperature by 5° F. (or other). Then, during cool weather, sensor 19 activates the relay to activate the "cool weather" differential thermostat which starts and stops pump 10. That may occur, for example, when collector temperature exceeds storage temperature by 25° F. (or other).

The source of auxiliary heat may be a "radiator", such as a "baseboard" heater or such at 21, and it may be supplied by heat from the domestic water heater 22 of the home. Then such heater or radiator need not necessarily be placed in the top of container 1 as illustrated at 8. It may, for example, be located in the top of the heat bin, as illustrated. A thermostat 23 opens valve 24 to admit hot water to unit 21 from hot water outlet 25. A typical domestic gas water heater has a heat input of 37,000 to 75,000 Btu per hour, (with a slightly lower output). An oil-fired domestic water heater has an oven greater heat output. That amount of heat, plus that obtained from storage, will meet the auxiliary heat requirements for a fairly large home during cold cloudy weather, without a separate furnace. And, it is noteworthy that the full capacity of the domestic water heater is seldom needed anyway for hot water for the home, particularly in the presently described system. The combination yields good results and eliminates the need for a furnace for the following reasons.

1. The domestic water preheater 6 partially heats the domestic water thereby reducing the need for additional heat from the gas or oil fired or electric water heater 22.

2. The need for auxiliary heat for the home is usually greatest during the early morning hours, at a period when use of domestic hot water is at a minimum. That leaves most of the output of the gas or oil or electric water heater available to supplement heat output from the stored solar heat in bin 4.

3. There is nearly always some heat still coming out of storage, even after several cloudy days, so the domestic water heater, when used as an auxiliary heat source, seldom needs to supply the entire heat load for the home.

OPERATION, (Heat Collection - Cooling - Storage)

A. Cold Weather - Maximum Collection

When the sun shines during the cold winter the temperature at sensor 18 in the solar heat collector exceeds that at sensor 17 in heat storage bin 1 by a pre-determined differential, say 5° F., and that unbalance turns pump 10 on to draw liquid from container 1 and send it to heat collector 9 where it is heated and back to container 1, warming domestic water in container 6 as it passes through tank 5. Pump 10 is cut off when the temperature at sensor 17 rises nearly to the temperature at sensor 18, or when the temperature at 18 drops nearly to that at 17, (due to a cloud, or approach of sundown), or when cold water going to the collector lowers the temperature at 18). That pre-determined differential of, say 5° F., may be set manually by control device 20. Or, the differential may be set automatically by sensor 19 outside. Sensor 19 sets the differential at a low level, for maximum solar heat collection, during cold weather. In simple words, the pump runs for more hours per day collecting virtually every Btu that is worthy of collection, considering the cost of electricity to run the pump, wear on the pump, etc.

B. Cool Weather - Selective Collection

As the weather becomes less cold the solar heat collector pump need not be operated as long each sunny day because less heat is needed. Therefore the differential is set at, say 30° F., or other. This change may be made manually by control 20 or automatically by sensor 19 which is responsive to the less cold temperatures outside. The pump operates fewer hours per day and saves electricity and pump wear. The pump will be turned on later in the morning because the collector temperature does not exceed that in storage by the 30°

F. differential as early as when the differential was only 5° F. Similarly the pump will be turned off earlier. And, the pump will not cut on as often during hazy sun or bright cloudy hours. Desirable results include the following.

1. Excessive quantities of heat are not collected so there is less liklihood of overwarming the home from heat leakage from storage to the living quarters during cool or mild weather.
2. Less electric power is used to operate the pump.
3. The pump does not wear out as fast.
4. The domestic water is hotter because the increased differential causes the pump to operate only when the collector is hotter. Therefore there is more heating of domestic water by solar energy, accompanied by a reduced use of electricity to run the pump and reduced energy to heat the domestic water.

During cool weather some heated water goes on into storage after it passes through domestic water preheater 5. That heat is available to keep the home warm during cool weather.

C. Warm or Hot Weather - Minimum Collection/Cooling

As the weather becomes warm or hot so that little or no solar home heating is needed the control is set for a wider differential, say 50° F., or other. Here again the manual control may be used, or the sensor 19 automatically sets the differential so that the pump operates only a short time per day to heat domestic water, or not at all if domestic water heating is not desired. (If the differential is set wide enough the pump will not be turned on at all because the heat collector temperature will reach a maximum and will not become any hotter.)

As the summer days become hotter, if air conditioning is used, control 16 may be used to enable operation of cooling compressor 14 to cool coil 13 and the air passing therethrough to cool stones 3 and tank of liquid 1. Under such conditions insulation 5' minimizes heat loss from the hot domestic water at 5, 6 to the cold storage rocks and tank of liquid. If desired pump 10 may take the water directly from preheater unit 5 back to the heat collector to prevent hot water from going into cold tank 1. Of course a sensor similar to 17 could then be used in tank 5 to cooperate with sensor 18, control 16, etc. to turn the pump on and off automatically. Alternatively solar heat collection may be dispensed with entirely for the few hot months and the domestic water may be heated by the usual domestic water heater 22 only. Hot water from preheater 6 preferably flows to an ordinary domestic water heater 22 which assures that domestic hot water coming out at 25 is always at the desired temperature, say 135° F.

If desired clock 15 may be used to enable operation of compressor 14 only at night or during the cool hours, say from 10:00 P.M. to 10:00 A.M. Coldness is produced and stored for use during the hot day. By such operation the compressor produces more Btus of cooling with less electricity, thereby alleviating the Energy Crisis. Also, compressor 14 operation at night leaves more power available for other homes during hot afternoons and evenings during brown-out periods. Further, a smaller and less-expensive compressor is usable because it is more efficient in discharging the heat to cool night air instead of hot daytime air. And, the head pressure on the compressor is reduced, thereby reducing the load and increasing the life of the compressor.

If compressor operation is limited to the cooler hours by clock switch 15 then the effect of sensor 19 on compressor operation may be eliminated. Or, a second sensor 19' outside of the building may be used together with a clock switch to start compressor 14 through control 16 only on warm nights. (Warm nights usually mean hot days to follow, so air conditioning will be needed and cold should be stored.) This sensor affects operation of control 16 and compressor 14 in a simple but desirable manner. That is, the hotter the night the sooner compressor 14 comes on and the later it stays on in the morning. Stated conversely, if the night is only warm, or cool, the clock switch may close at, say 10:00 PM, but sensor 19' causes control 16 to turn the compressor on later at night, and off earlier in the morning before clock switch 15 opens at, say 10:00 A.M. That causes more efficient cooling during the coolest hours of the night during periods when only a small amount of cooling is needed. Yet, when added amounts of cooling are needed, the system automatically adjusts to the higher load by turning the compressor on for additional hours of the night. However, for exceptionally hot spells that occur only once a year, or once in 10 years, the controls can be bypassed by a simple circuit and switch not illustrated and the compressor can be operated for more hours, 24 hours a day if necessary to meet the abnormal load for a few days. A simple low-limit thermostat in storage bin 4 may be used if desired to disable compressor 14 when the temperature is low enough to meet the maximum cooling demand for the next day, to thereby conserve power.

Changeable Absorbtion Coating

Certain coatings that can be used on the surface 9' of the Thomason open-flow collector (see U.S. Pat. No. 3,215,134), will reject more heat when the fluid is not flowing, such as on hot summer days when no heat is needed. Then, when a proper fluid is flowed thereover the surface 9' changes and becomes more highly absorptive, and more efficient for solar heat collection, during the winter for example. Many combinations of coatings and liquids, or gases, or both, will exhibit this highly desirable phenomena. One example is a liquid (predominantly water) and a coating of aluminum oxide. When the aluminum oxide is dry it is a light silvery gray color and reflects away a certain percentage of the incoming solar energy but when wetted it becomes darker in color and more absorptive, that is, it absorbs more and reflects away a lower percentage of the energy. Many other combinations may be used.

OPERATION, (Getting Heat or Cold Out of Storage)

A. Heating

A heating thermostat, as illustrated at 23, turns on the motor (not shown) for blower 11 as needed to force air through distributor 2 and stones 3 and out into space to be heated, such as a home. Preferably the thermostat is one of a standard known type that has two sets of cntacts, a first set to close at any temperature selected, say 71° F., to start the blower, and a second set to close at, say 3° lower, (68° F.) to turn on auxiliary heat source 8 or to open valve 24 to admit hot water to "radiator" 21, or both. (If desired two thermostats may be used instead of one with two sets of contacts. One would be set, say 3° F. lower than the other.) Thus, if the home temperature drops to 71° F. the blower 11 is started automatically to blow heat out of storage to the home. If such stored heat is inadequate the home temperature eventually, slowly, drops to 68° F. and auxiliary heat is then automatically turned on at 8, or at 21, or both. The blower continues operating getting heat out of storage and auxiliary heat is added only for a small portion of the heat load. No extra blower, or filter, or damper, is needed. No standby furnace is needed. And, very importantly, if cloudy weather persists with no replenishment of the heat in storage, the blower gets virtually every Btu of heat out of storage, down to near 68° F., using auxiliary heat only as required to supplement that obtained from storage. Then, when the sun returns, the heat collector pump goes into operation with efficiency of collection being high. That is because the low-temperature water picks up heat earlier in the morning even with relatively weak sunshine.

It should be noted that not even a circulating pump is required (although one could be used) to get hot water to circulate through radiator or heat exchanger 21. When the home thermostat opens valve 24 the hot water flows over into unit 21 where the heat is given up to cool air flowing therearound. That cools the water and the cool water, being heavier, flows down to the bottom of domestic water heater 22 where it is reheated. The occasional use of domestic hot water in the home, through hot water line 25, does not materially affect operation through unit 21. Indeed, it can enhance flow therethrough if the plumbing connections are installed in a well-known manner such that water flowing through the domestic water line induces flow through unit 21, somewhat as illustrated in the drawings.

B. Cooling

Coldness and dryness are produced, preferably at night, and stored by drawing air through cooling coil 13, where it is chilled and dried, thence to distributor 2 and out into stones 3. Many gallons of water are wrung out of the air every night in hot humid climates. The cold dry air chills and dries the stones and chills the tank of liquid while compressor 14 operates. Then while the compressor is not running warm moist air blown through the cold dry stones is cooled and dehumidified, with heat and moisture being absorbed by the stones. The container of liquid, also chilled while the compressor operates, also absorbs heat during the hot day.

If desired a bypass and damper, (not shown), from the top of the cold storage bin back to the air return may be used. The damper is opened as needed to prevent overcooling of the home and permit continued cold storage, during late cool hours of the night for example. Also a thermostat in the cold storage bin (not shown) may be used to automatically disable compressor 14 when the temperature in the bin reaches a desired level, 35° to 45° F. for example.

I claim:

1. Heat storage and solar heat collecting apparatus, means to transfer heat from said collecting to said storage apparatus, control means to operate said transfer means comprising a first sensor responsive to temperatures in said storage apparatus and a second sensor responsive to temperatures in said collecting apparatus, said first and second sensors comprising means to activate said control means to start said transfer means when the temperature in the collecting apparatus exceeds that in storage by a first differential, third sensor means connected to said control means to activate it to start said transfer means when the temperature in the collecting apparatus exceeds that in storage by a second differential wherein said third sensor means is responsive to ambient temperatures to automatically switch to said first differential or to said second differential responsive to ambient temperatures.

2. Apparatus as in claim 1 wherein switching to said first differential occurs responsive to lower ambient temperatures and switching to said second differential occurs responsive to higher ambient temperatures.

3. Apparatus as in claim 1, and means to adjust said first differential.

4. Apparatus as in claim 1 and means to adjust said second differential.

5. Apparatus as in claim 1 and means to adjust said first and said second differentials.

6. Apparatus as in claim 1 and cooling means to cool said storage apparatus, and fourth sensor means being connected to said cooling means to automatically actuate said cooling means responsive to high ambient temperatures.

7. Apparatus as in claim 6 and means to enable operation of said cooling means only at certain periods.

* * * * *